United States Patent
Taniguchi et al.

(10) Patent No.: US 9,061,551 B2
(45) Date of Patent: Jun. 23, 2015

(54) PNEUMATIC TIRE

(75) Inventors: Jiro Taniguchi, Osaka (JP); Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1174 days.

(21) Appl. No.: 13/004,938

(22) Filed: Jan. 12, 2011

(65) Prior Publication Data
US 2011/0220258 A1 Sep. 15, 2011

(30) Foreign Application Priority Data

Mar. 9, 2010 (JP) .................................. 2010-052009

(51) Int. Cl.
*B60C 11/12* (2006.01)
*B60C 11/03* (2006.01)

(52) U.S. Cl.
CPC ......... B60C 11/0306 (2013.04); *B60C 11/1263* (2013.04); *B60C 11/1272* (2013.04); *B60C 11/1259* (2013.04); *B60C 11/1204* (2013.04); *B60C 11/1222* (2013.04); B60C 11/12 (2013.01); B60C 11/1218 (2013.04); *B60C 2011/1209* (2013.04); B60C 11/1281 (2013.04); B60C 11/0323 (2013.04); *B60C 2011/0388* (2013.04); *B60C 2011/0383* (2013.04)

(58) Field of Classification Search
CPC  B60C 11/12; B60C 11/1204; B60C 11/1218; B60C 11/1222; B60C 11/1236; B60C 11/124; B60C 11/1263; B60C 11/1281; B60C 11/1231; B60C 11/1259; B60C 11/1272; B60C 2011/1277; B60C 11/0306; B60C 2011/0388; B60C 2011/1209

USPC ............... 152/209.1, 209.18, 209.21, 209.23, 152/209.24, 209.25, 209.27
See application file for complete search history.

(56) References Cited

U.S. PATENT DOCUMENTS

| | | | | |
|---|---|---|---|---|
| 5,385,189 | A * | 1/1995 | Aoki et al. | 152/209.21 |
| 6,315,018 | B1 * | 11/2001 | Watanabe | 152/209.21 |
| 6,527,024 | B1 * | 3/2003 | Ashmore | 152/209.22 |
| 7,793,692 | B2 * | 9/2010 | Nguyen et al. | 152/209.21 |
| 8,162,642 | B2 * | 4/2012 | Van Nguyen et al. | 425/28.1 |
| 8,297,323 | B2 * | 10/2012 | Takahashi et al. | 152/209.3 |
| 8,439,094 | B2 * | 5/2013 | Asayama et al. | 152/209.18 |
| 2006/0016537 | A1 * | 1/2006 | Kuroda | 152/209.18 |
| 2007/0095447 | A1 * | 5/2007 | Nguyen et al. | 152/209.18 |
| 2007/0102085 | A1 * | 5/2007 | Ohashi | 152/209.18 |

(Continued)

FOREIGN PATENT DOCUMENTS

| | | | |
|---|---|---|---|
| EP | 0963864 A2 * | 12/1999 | B60C 11/12 |
| EP | 1616721 A1 * | 1/2006 | B60C 11/12 |

(Continued)

*Primary Examiner* — Seyed Masoud Malekzadeh
(74) *Attorney, Agent, or Firm* — Fish & Richardson P.C.

(57) ABSTRACT

A pneumatic tire has a tread that is provided with a plurality of blocks comparted in a tire circumferential direction by a lateral groove. A sipe formed in each of the blocks has a narrow portion that is open in a tread surface, and a wide portion that is communicated with an inner side in a tire diametrical direction of the narrow portion and is widened than the narrow portion. The wide portion gradually increases a widening length in one side in a width direction and gradually decreases a widening length in other side in the width direction, from one end portion of the sipe toward other end portion, and accompanies an angle change at a time of appearing on the tread surface due to a progress of a wear.

4 Claims, 5 Drawing Sheets

(56) References Cited

U.S. PATENT DOCUMENTS

| | | | |
|---|---|---|---|
| 2009/0050248 A1* | 2/2009 | Ohashi | 152/209.18 |
| 2009/0078350 A1* | 3/2009 | Ohashi | 152/209.18 |
| 2010/0084062 A1* | 4/2010 | Miyazaki et al. | 152/209.18 |
| 2010/0206446 A1* | 8/2010 | Oizumi | 152/209.18 |
| 2011/0048602 A1* | 3/2011 | Hayashi | 152/209.18 |
| 2011/0048603 A1* | 3/2011 | Kleffmann et al. | 152/209.21 |
| 2011/0126951 A1* | 6/2011 | Hitotsuyanagi | 152/209.18 |
| 2011/0290392 A1* | 12/2011 | Ohashi et al. | 152/209.18 |
| 2011/0315289 A1* | 12/2011 | Ohashi | 152/209.18 |
| 2012/0048439 A1* | 3/2012 | Christenbury | 152/209.18 |
| 2012/0090749 A1* | 4/2012 | Ohashi | 152/209.18 |

FOREIGN PATENT DOCUMENTS

| | | | | |
|---|---|---|---|---|
| FR | 2722145 A1 | * | 1/1996 | B60C 11/12 |
| JP | 2000-211321 | * | 8/2000 | B60C 11/11 |
| JP | 2003159910 A | | 6/2003 | |
| JP | 2008260423 A | | 10/2008 | |

* cited by examiner (a)

(b)

(a)

(b)

PNEUMATIC TIRE

BACKGROUND OF THE INVENTION

1. Field of the Invention

The present invention relates to a pneumatic tire which can suppress a heel and toe wear while holding a hydroplaning resistance.

2. Description of the Related Art

In a studless tire which is used in a traveling on a snowy road, a cut called as a sipe is formed in a block on a tread, and a drivability on the snowy road is enhanced by an edge effect of the sipe. On the other hand, if a groove depth comes to a halving state due to a progress of a wear, it is hard to hold a studless performance. Accordingly, there is an actual condition that the tire cannot be used as a winter tire. Therefore, in order to extend a tire service life, there can be considered that a worn studless tire is utilized as a summer tire, however, it is important to keep a draining performance and improve an irregular wear resistance for that purpose.

In Japanese Unexamined Patent Publication No. 2003-159910, there is described a pneumatic tire in which blocks are comparted by a slit 21 and a chamfer 22 is formed in an edge of a tread surface thereof, as shown in FIG. 8. There is described that it is possible to improve a draining performance by an enlargement of a groove volume in a wide portion 23, and it is possible to ease the heel and toe wear by the chamfer 22. The heel and toe wear is one form of an irregular wear which is generated on the tire, and is generated by one of a trailing side and a leading side of a block being worn on ahead in comparison with the other side in correspondence to an input in a circumferential direction to the block by a tire rolling.

In Japanese Unexamined Patent Publication No. 2008-260423, there is described a pneumatic tire structured such that a sipe 25 shown in FIG. 9 is formed in a land portion of a tread, and a tread pattern is changed from an asymmetric shape to a point symmetric shape by an exposure of a cavity 26 in accordance with a progress of a wear. There is described that a heel and toe wear can be suppressed by changing an installation direction of the tire so as to invert a trailing side and a leading side after the change of the tread pattern mentioned above.

However, since a rigidity in one side which is widened by the wide portion 23 is lowered over a whole length in the slit 21 mentioned above, and a rigidity in the both sides which are widened by the cavity 26 is lowered over a whole length in the sipe 25 mentioned above, a rigidity of an end portion of the block tends to be reduced, and an effect of suppressing the heel and toe wear cannot be regarded as being sufficient. Further, since there is a fear of such a rigidity reduction, there is a case that it is actually hard to greatly widen the wide portion 23 and the cavity 26, and there has been a possibility for improving the hydroplaning resistance.

SUMMARY OF THE INVENTION

The present invention is made by taking the actual condition mentioned above into consideration, and an object of the present invention is to provide a pneumatic tire which can suppress a heel and toe wear while holding a hydroplaning resistance.

The object can be achieved by the following present invention. That is, the present invention provides a pneumatic tire comprising a tread that is provided with a plurality of blocks comparted in a tire circumferential direction by a lateral groove, wherein a sipe formed in each of the blocks has a narrow portion that is open in a tread surface, and a wide portion that is communicated with an inner side in a tire diametrical direction of the narrow portion and is widened than the narrow portion, and wherein the wide portion gradually increases a widening length in one side in a width direction and gradually decreases a widening length in other side in the width direction, from one end portion of the sipe toward other end portion, and accompanies an angle change at a time of appearing on the tread surface due to a progress of a wear.

In the pneumatic tire in accordance with the present invention, since the wide portion gradually increases the widening length in one side in the width direction, and gradually decreases the widening length in the other side in the width direction, from one end portion of the sipe toward the other end portion thereof, it is possible to prevent a rigidity in each of the sides which are widened by the wide portion from being lowered over a whole length. As a result, it is easy to secure a rigidity of the end portion of the block, and it is possible to suppress the heel and toe wear. Further, since the wide portion accompanies the angle change at a time of appearing on the tread surface, the wide and long groove can be formed after the wear, and it is possible to greatly widen the wide portion in correspondence to the rigidity held as mentioned above. Accordingly, it is possible to sufficiently hold the hydroplaning resistance.

In the pneumatic tire in accordance with the present invention, it is preferable that the wide portion gradually widens toward an inner side in the tire diametrical direction. In accordance with the structure mentioned above, it is possible to effectively suppress the heel and toe wear by easing a rapid rigidity change in a process that the wear makes a progress. Further, in this case, it is preferable that the wide portion widens by a stepped wall surface including a portion extending in the tire diametrical direction. Accordingly, since the portion extending in the tire diametrical direction appears on the tread surface in the process of progressing the wear, and an edge effect can be achieved by the portion, it is possible to improve a drivability on a snowy road.

In the pneumatic tire in accordance with the present invention, it is preferable that the lateral groove is formed shallower than the sipe, and the wide portion appears on the tread surface at a time when the lateral groove disappears due to the progress of the wear. In the structure mentioned above, since the wide portion appears in place of the lateral groove on the worn tread surface, it is possible to change the compartment of the blocks in correspondence to a tire performance demanded after the wear. Accordingly, it is possible to effectively enhance the hydroplaning resistance after the wear, for example, by making the angle of the wide portion with respect to the tire width direction larger than that of the lateral groove.

In the pneumatic tire in accordance with the present invention, it is preferable that the sipe extends while intersecting the lateral groove, and the wide portion widens a side apart from the lateral groove larger than a side closer thereto, in the both end portions of the sipe. In accordance with the structure mentioned above, it is possible to effectively suppress the heel and toe wear by well preventing the rigidity reduction in the end portion of the block interposing between the sipe and the lateral groove.

In the pneumatic tire in accordance with the present invention, it is preferable that the wide portion gradually decreases a depth from the tread surface to a widening portion in the one side in the width direction, and gradually increases a depth from the tread surface to a widening portion in the other side in the width direction, from the one end portion of the sipe toward the other end portion. In this case, it is possible to further suppress the rigidity reduction caused by the widening of the wide portion so as to well suppress the heel and toe wear. Further, a sipe blade for forming the sipe can be easily drawn out of the tread at a time of curing the tire, and it is possible to improve a formability.

BRIEF DESCRIPTION OF THE DRAWINGS

FIG. 3(a) shows a wall surface close to a center side of a block and FIG. 3(b) shows a wall surface close to a shoulder side of the block;

DETAILED DESCRIPTION OF THE PREFERRED EMBODIMENTS

Figure 1:
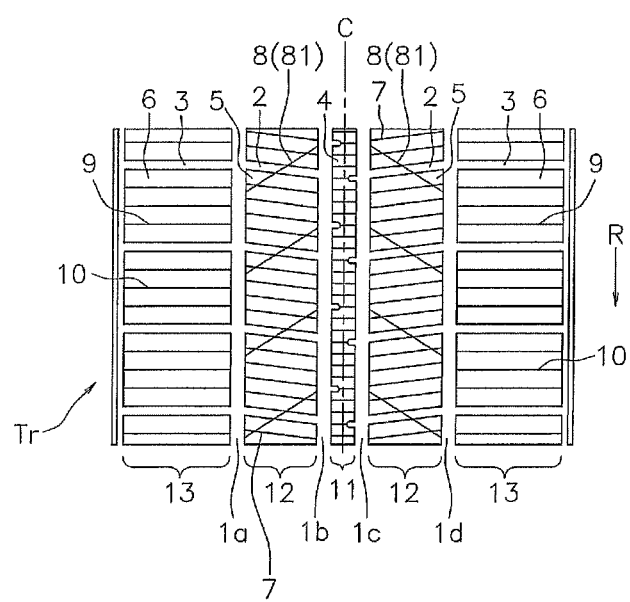
FIG. 1 is a plan view showing a tread of a pneumatic tire in accordance with the present invention at a time when it is new.

An embodiment of the present invention will be explained with reference to the drawings. A plurality of circumferential grooves 1a to 1d extending along a tire circumferential direction are formed in a tread Tr shown in FIG. 1, whereby a plurality of land portions are comparted. The plurality of land portions are constructed by a center land portion 11 which is arranged in the vicinity of a tire equator C, a pair of shoulder land portions 13 arranged in outermost sides, and a pair of mediate land portions 12 each arranged therebetween. In the present embodiment, there is shown an example in which a tread pattern is formed symmetrically with regard to the tire equator C, however, the present invention is not limited to this example.

The center land portion 11 is constructed by a rib 4 continuously extending in the tire circumferential direction, and the mediate land portions 12 and the shoulder land portions 13 are constructed by a plurality of blocks 5 and 6 which are comparted in the tire circumferential direction by lateral grooves 2 and 3, respectively. The pneumatic tire in accordance with the present embodiment is a studless tire on the assumption of traveling on a snowy road, and intends to improve a drivability on the snowy road by a plurality of sipes which are formed in the rib 4 and the blocks 5 and 6. The tire rotates in a direction R.

Figure 2:
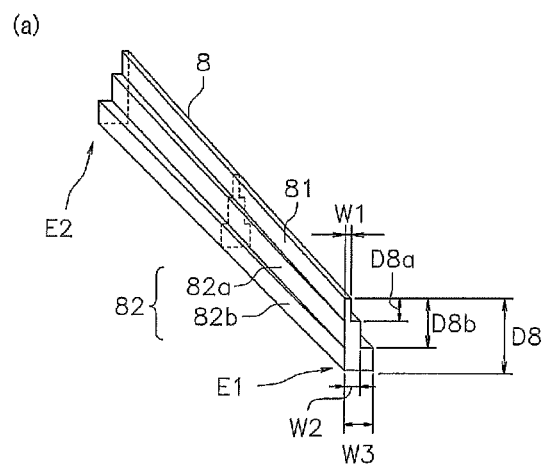
FIG. 2(a) is a perspective view and FIG. 2(b) is an outline plan view each of which shows an inner shape of a sipe.
Figure 2:
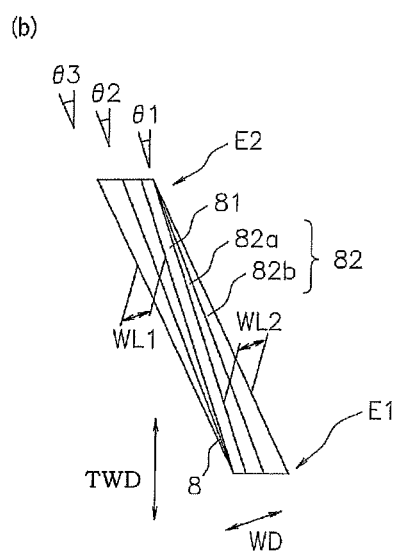

In the blocks 5, sipes 8 each having an inner shape shown in FIG. 2 are formed so as to intersect the lateral grooves 2, in addition to a plurality of sipes 7 which are arranged approximately in parallel to the lateral grooves 2. The sipe 8 has a narrow portion 81 which is open in a linear shape in the tread surface, and a wide portion 82 which is communicated with an inner side in a tire diametrical direction of the narrow portion 81 and is widen than the narrow portion 81. A width W1 of the narrow portion 81 is approximately fixed along an extending direction thereof, and is set, for example, to 0.3 to 1.0 mm, in the light of suitably achieving an edge effect as well as well suppressing the heel and toe wear.

One end portion E1 of the sipe 8 is open to the circumferential groove 1a or 1d, and other end portion E2 is open to the circumferential groove 1b or 1c. The wide portion 82 gradually increases a widening length WL1 in one side (a left side in FIG. 2) in a width direction WD, and gradually decreases a widening length WL2 in the other side (a right side in FIG. 2) in the width direction WD, from the one end portion E1 toward the other end portion E2, so as to accompany an angle change at a time of appearing on the tread surface in accordance with a progress of the wear. The widening lengths WL1 and WL2 are measured in the width direction WD of the sipe 8 (the width direction of the narrow portion 81) with respect to a wall surface of the narrow portion 81.

In an early stage of the wear in which the narrow portion 81 is open in the tread surface, an angle of incline of the sipe 8 is θ1. On the contrary, when the narrow portion 81 disappears due to a progress of the wear and the wide portion 82 appears on the tread surface, the angle of incline changes from θ1 to θ2. Here, θ1 and θ2 are respectively angles in the extending direction of the narrow portion 81 and the wide portion 82 (an intermediate portion 82a to be mentioned below) with respect to a tire width directions TWD. In the present embodiment, the angle θ2 is larger than the angle θ1, and this is advantageous for improving the hydroplaning resistance after the wear. The extending directions of the narrow portion 81 and the wide portion 82 can be respectively defined by center lines in the width directions thereof.

In accordance with the structure mentioned above, since it is possible to prevent a rigidity in each of the sides which are widened by the wide portion 82 from being lowered over a whole length, it is easy to secure a rigidity of the end portion of the block 5, and it is possible to suppress the heel and toe wear. Further, since the wide portion 82 accompanies the angle change at a time of appearing on the tread surface, the wide and long groove can be formed after the wear as mentioned below, and it is possible to greatly widen the wide portion 82 in correspondence to the rigidity held as mentioned above. Accordingly, it is possible to sufficiently hold the hydroplaning resistance.

The sipe 8 can be formed by using a sipe blade having a shape corresponding to the inner shape as shown in FIG. 2, at a time of curing the tire. FIG. 2 shows the inner shape of the sipe 8 independently, however, since the sipe 8 intersects the lateral groove 2 in the present embodiment, a space overlapping the lateral groove 2 is actually formed in a center portion in a longitudinal direction of the sipe 8.

Since the wide portion 82 gradually widens toward an inner side in the tire diametrical direction, it is possible to ease a rapid rigidity change in a process that the wear makes a progress. Further, the wide portion 82 has an intermediate portion 82a which is wider than the narrow portion 81 and is continuously provided to an inner side in the tire diametrical direction of the narrow portion 81, and a bottom portion 82b which is wider than the intermediate portion 82a and is communicated with the narrow portion 81 via the intermediate portion 82a. Accordingly, the wide portion 82 is widened by a stepped wall surface including a portion extending in the tire diametrical direction (a wall surface of the intermediate portion 82a). When the portion extending in the tire diametrical direction appears on the tread surface due to the progress of the wear, it is possible to achieve the edge effect in the portion so as to improve the drivability on the snowy road.

When the wide portion 82 appears on the tread surface due to the progress of the wear, the angle change from θ1 to θ2 is brought about as mentioned above. In the present embodiment, when the intermediate portion 82a disappears and the bottom portion 82b is exposed due to the a further progress of the wear, an angle change from θ2 to θ3 is brought about, and a draining performance can be enhanced by further enlarging the angle of incline. The angle change amount from θ1 to θ3 is, for example, from 3 to 15 degrees.

Figure 3:
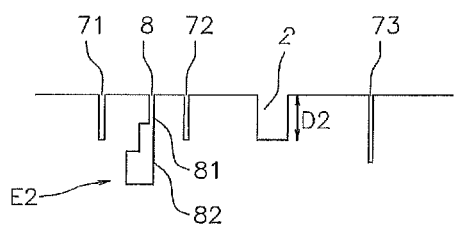
FIGS. 3(a) and 3(b) are projection views as seen from an outer side in a tire width direction.
Figure 3:
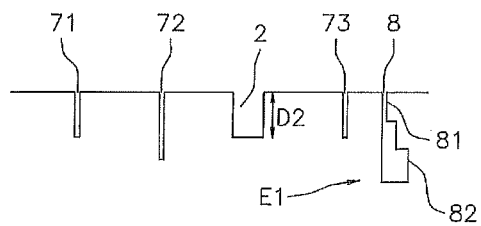

FIG. 3 is a projection view at a time of viewing a wall surface of the block 5 arranged between the circumferential grooves 1a and 1b from an outer side in the tire width direction. In FIG. 3, sipes 71 to 73 are shown as the sipes 7 each having a uniform width in the tire diametrical direction, and the sipe 71 among them is formed with the same depth as that of the lateral groove 2 over a whole length thereof. On the other hand, the sipe 72 is formed deeper than the lateral groove 2 in such a manner as to be left even at a time of 50% wear in a range from a wall surface close to the shoulder side of the block 5 to the sipe 8, and the sipe 73 is formed in the same manner in a range from a wall surface close to the center side of the block 5 to the sipe 8.

Figure 4:
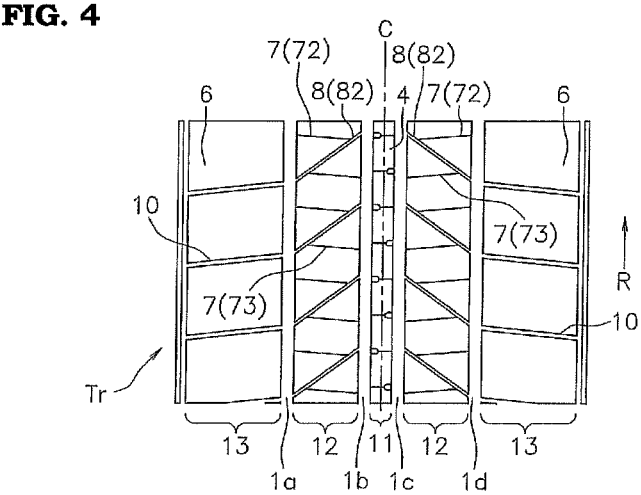
FIG. 4 is a plan view of the tread shown in FIG. 1, at a time when it is worn by 50%.

The lateral groove 2 is formed shallower than the sipe 8, however, has a groove depth equal to or more than that of the narrow groove 81, and is structured such that the wide portion 82 appears on the tread surface as shown in FIG. 4 at a time when the lateral groove 2 disappears due to the progress of the wear. In the present embodiment, a groove depth D2 of the lateral groove 2 is about 50% of the groove depth of the circumferential groove, and it disappears with the 50% wear when a platform (not shown) is exposed to the tread surface. Accordingly, the heel and toe wear is not generated in the lateral groove 2 thereafter.

In the studless tire which is utilized as the summer tire after the wear, a drivability on the snowy road at a time when it is new, and a hydroplaning resistance after the wear are regarded as important. In the present embodiment, since the lateral groove 2 extends in the tire width direction at a time when it is new, it is possible to enhance a traction by a shear force of the snow filled in the lateral groove 2 so as to improve the drivability on the snowy road. Further, when the wide portion 82 appears in place of the lateral groove 2 on the tread surface after the wear, a lateral groove which is greatly inclined with respect to the tire width direction is newly formed, and it is possible to effectively improve the hydroplaning resistance. Furthermore, it is excellent in the effect of suppressing the heel and toe wear, as mentioned above.

In the present embodiment, an installing direction of the tire onto a vehicle is changed after the lateral groove 2 disappears, and the rotating direction R of the tire is inverted between the states shown in FIG. 1 and FIG. 4. Since the installing direction is changed as mentioned above, it is easy to smoothly discharge water in the circumferential grooves 1b and 1c through the wide portion 82 having a large angle of incline, and it is possible to improve the hydroplaning resistance. Further, the change of the installing direction mentioned above is useful also for suppressing an irregular wear in each of the sipes 72 and 73 remaining after the lateral groove 2 disappears. As mentioned above, in the tire, it is possible to effectively utilize a rotation method of changing the installing direction after the wide portion 82 appears on the tread surface, with regarding to installing onto the vehicle.

A depth D8 of the sipe 8 is set, for example, to 85 to 100% of the groove depth of the circumferential groove. As a ratio D8a/D8 of a depth (a groove depth of the narrow portion 81) D8a from the tread surface to the intermediate portion 82a with respect to the groove depth D8, a value from 0.2 to 0.5 is exemplified. Further, as a ratio D8b/D8 of a depth D8b from the tread surface to the bottom portion 82b with respect to the groove depth D8, a value from 0.5 to 0.80 is exemplified.

A width W2 of the intermediate portion 82a is preferably from 1.5 to 3.5 mm for enhancing the draining performance, and is more preferably from 2.0 to 3.0 mm. Further, a width W3 of the bottom portion 82b is preferably from 3.0 to 7.0 for enhancing the draining performance, thereby being wide such that it is not inferior to the normal lateral groove. Since a height of the block 5 is reduced in a stage in which the wide portion 82 is open in the bottom portion 82b, a risk that the heel and toe wear is generated is small even if it is wide to such a degree. The widths W2 and W3 are approximately constant respectively along the extending directions of the intermediate portion 82a and the bottom portion 82b, and are measured in the respective width directions.

In such a case that the sipe extends while intersecting the lateral groove as in the present embodiment, if the widening length is uniform in one side or in the both sides widened by the wide portion of the sipe, a rigidity reduction tends to be generated in the end portion of the block interposing between the sipe and the lateral groove, particularly in a corner portion, whereby the heel and toe wear tends to be caused. Accordingly, in this sipe 8, the wide portion 82 widens more the side away from the lateral groove 2 than the side close thereto, in both of the end portions E1 and E2. In other words, as shown in FIG. 3, a right side away from the lateral groove 2 is widened larger in the end portion E1, and a left side away from the lateral groove 2 is widened larger in the end portion E2, whereby it is possible to effectively suppress the heel and toe wear.

In the present embodiment, a wall surface in an opposite side to the side widened large is formed to be flat, in each of the end portions E1 and E2 of the sipe 8, and the widening length WL1 in the end portion E1 and the widening length WL2 in the end portion E2 are substantially zero. Accordingly, it is easy to secure the rigidity of the end portion of the block 5, and it is effective for suppressing the rigidity reduction in the corner portion of the block 5 particularly with regard to the sipe 8 extending while intersecting the lateral groove 2 as shown in FIG. 1.

In the block 6 constructing the shoulder land portion 13, there are formed a plurality of sipes 9 which are arranged approximately in parallel to the lateral grooves 3, and sipes 10 each having the same inner shape as in FIG. 2. The lateral groove 3 and the sipe 9 are formed with the same depth as the lateral groove 2, and disappear as shown in FIG. 4 when the wear makes a progress. On the other hand, in the sipe 10, a wide portion appears on the tread surface accompanying an angle change after the wear, whereby it is possible to improve the hydroplaning resistance. With regard to the sipe 10, an angle θ1 is preferably from 0 to 5 degrees in the light of improving the traction on the snowy road, and an angle θ3 is preferably from 3 to 15 degrees in the light of improving the hydroplaning resistance.

Figure 5:
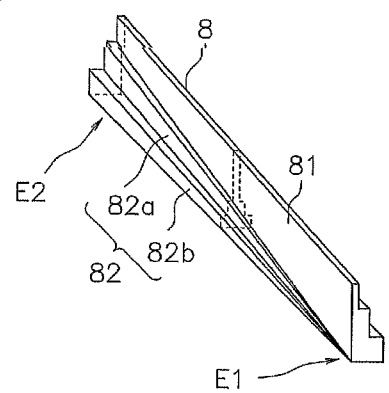
FIG. 5 is a perspective view showing an inner shape of a sipe in accordance with other embodiment.
Figure 6:
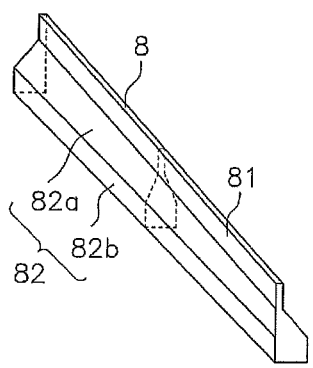
FIG. 6 is a perspective view showing an inner shape of a sipe in accordance with other embodiment.
Figure 7:
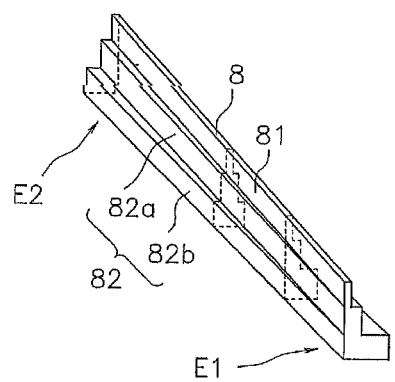
FIG. 7 is a perspective view showing an inner shape of a sipe in accordance with other embodiment.

FIGS. 5 to 7 show a modified example of the sipe 8. In the sipe 8 shown in FIG. 5, the wide portion 82 gradually decreases a depth (corresponding to the depth D8a or D8b in FIG. 2) from the tread surface to a widening portion in one side (a left side in FIG. 5) in a width direction, and gradually increases a depth from the tread surface to a widening portion in the other side (a right side in FIG. 5) in the width direction, from the one end portion E1 toward the other end portion E2. In accordance with the structure mentioned above, it is possible to well suppress the heel and toe wear by further suppressing the rigidity reduction by the widening portion of the wide portion 82, and it is possible to improve a formability by making the sipe blade easy to be drawn out.

In the sipe 8 shown in FIG. 6, the wide portion 82 is formed in such a manner as to be gradually widened toward the inner side in the tire diametrical direction, and the wall surface of the intermediate portion 82a is formed by a slope surface which is inclined with respect to the tire diametrical direction. Accordingly, it becomes excellent in an effect of easing a rapid rigidity change in the process that the wear makes a progress.

In the sipe 8 shown in FIG. 7, the width is gradually increased toward the outer side in the tire width direction, that is, from the other end portion E2 toward the one end portion E1. In accordance with the structure mentioned above, it is possible to efficiently enhance the draining performance, and it is useful particularly to be formed in the block 6 constructing the shoulder land portion 13. In this example, the respective widths (corresponding to the widths W1 to W3 in FIG. 2) of the narrow portion 81 and the wide portion 82 are gradually increased, however, it is preferable to gradually increase at least the width of the wide portion 82.

The present invention is not limited to the embodiment mentioned above, but can be variously modified and changed within the scope of the present invention. The tread pattern shown in the embodiment mentioned above is only one example, and the pattern formed in the tread of the pneumatic tire in accordance with the present invention is not limited to this example.

Since the present invention achieves the operations and effects as mentioned above, the pneumatic tire in accordance with the present invention is useful particularly as a studless tire, while it can be applied to a so-called all season tire or a summer tire. Even in the case mentioned above, since it is possible to suppress the heel and toe wear while improving the hydroplaning resistance, it has a practicability.

EXAMPLES

An example tire which concretely shows the structure and effect of the present invention will be explained. An evaluation of each of performances is executed as follows.

(1) Hydroplaning Resistance

A test tire was installed onto a test vehicle (1500 cc, 4WD middle sedan vehicle), and a speed at which a tire wheel completely runs idle at a water depth 8 mm so as to generate a hydroplaning phenomenon was measured when it was new and when it had the 50% wear. An evaluation is carried out on by using an index number with a result of a comparative example 1 being set to 100, indicating that the larger the numerical value is, the more excellent the hydroplaning resistance is.

(2) Heel and Toe Wear Resistance

The test tire was installed onto the test vehicle mentioned above to travel on a general road, and a wear amount due to the heel and toe wear was measured when it had the 50% wear in which case the platform is exposed to the tread surface, as well as when it had the 75% wear. In this case, the installing direction of the tire is changed so as to invert the rotating direction thereof, after the measurement when it had the 50% wear.

(3) Drivability on Snowy Road

The test tire was installed to the test vehicle mentioned above to travel on the snowy road, and a subjective evaluation by a feeling test was carried out when the tire was new. An evaluation is carried out on by using an index number with a result of a comparative example 1 being set to 100, indicating that the larger the numerical value is, the more excellent the drivability on snowy road is.

Figure 8:
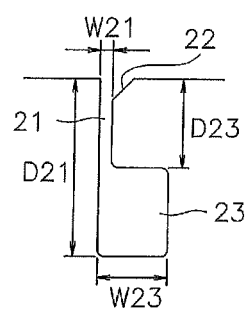
FIG. 8 is a cross sectional view of a sipe provided in a pneumatic tire described in Japanese Unexamined Patent Publication No. 2003-159910.
Figure 9:
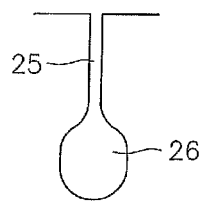
FIG. 9 is a cross sectional view of a sipe provided in a pneumatic tire described in Japanese Unexamined Patent Publication No. 2008-260423.

In the pneumatic tire having the tread pattern shown in FIG. 1 (size: 195/65R15), the comparative example 1 was set to the pneumatic tire in which slits formed uniformly in the cross sectional shape shown in FIG. 8 are applied as the sipes 8 and 10. Dimensions of the slits are D21: 9.0 mm, D23: 4.5 mm, W21: 0.5 mm, W23: 5.0 mm.

In the pneumatic tire having the tread pattern shown in FIG. 1 (size: 195/65R15), an example 1 was set to the pneumatic tire in which the sipe shown in FIG. 2 is applied to each of the sipes 8 and 10, an example 2 was set to the pneumatic tire in which the sipe shown in FIG. 5 is applied, and an example 3 was set to the pneumatic tire in which the sipe shown in FIG. 7 is applied. Dimensions measured in both the end portions E1 and E2 of the sipe are D8: 9.0 mm, D8a: 3.0 mm, D8b: 6.0 mm, W1: 0.5 mm, W2: 1.7 mm, and W3: 3.0 mm. In the end portion E1 of the example 3, W1: 0.7 mm, W2: 2.2 mm, and W3: 5.0 mm were set.

As common dimensions between the comparative example 1 and each of the examples 1 to 3, the groove depth of the circumferential grooves 1a to 1d is 9.0 mm, the depth of the lateral grooves 2 and 3 is 4.5 mm, the width of the lateral grooves 2 and 3 is 3 mm, the depth of the sipe 71 is 4.5 mm, the maximum depth of the sipes 72 and 73 is 7.0 mm, and the width of the sipes 7 and 9 is 0.4 mm.

TABLE 1

|  | Comparative example 1 | Example 1 | Example 2 | Example 3 |
|---|---|---|---|---|
| Hydroplaning resistance |  |  |  |  |
| (New tire) | 100 | 102 | 100 | 104 |
| (with 50% wear) | 100 | 103 | 101 | 105 |
| Heel and toe wear resistance |  |  |  |  |
| (with 50% wear) | 1.5 mm | 1.0 mm | 0.8 mm | 1.2 mm |
| (with 75% wear) | 0.8 mm | 0.6 mm | 0.4 mm | 0.6 mm |
| Drivability on snow | 100 | 103 | 103 | 103 |

The examples 1 to 3 can achieve the hydroplaning resistance to such a degree that is not inferior to that of the comparative example 1, among which the examples 1 and 3 can secure a groove volume of the sipe, so that an excellent result can be obtained. Further, the heel and toe wear is generated when the tire has the 50% wear in the comparative example 1. On the contrary, the heel and toe wear can be suppressed in the examples 1 to 3, among which an excellent result can be obtained in the example 2. Further, the examples 1 to 3 are more excellent in the drivability on the snowy road than the comparative example 1, and it can be considered that the rigidity of the blocks can well be secured.

What is claimed is:

1. A pneumatic tire comprising a tread that is provided with a plurality of blocks partitioned in a tire circumferential direction by a lateral groove, wherein
   a sipe formed in each of the plurality of blocks has a relatively narrow portion that is open in a tread surface, and a relatively wide portion that is communicated with an inner side in a tire diametrical direction of the relatively narrow portion and is wider than the relatively narrow portion, and
   the relatively wide portion gradually increases a widening length in one side in a width direction and gradually decreases a widening length in the other side in the width direction, from one end portion of the sipe toward the other end portion, and accompanies an angle change at a time of appearing on the tread surface due to a progress of a wear, a width (W1) of the relatively narrow portion is approximately constant along an extending direction thereof and for a distance in a depth direction, a ratio of a depth of the relatively narrow portion with respect to a depth of the sipe is 0.2 to 0.5, and a width of the relatively wide portion is approximately constant along an extending direction thereof, the relatively wide portion gradually widens toward an inner side in the tire diametrical direction, the relatively wide portion widens by a stepped wall surface including a portion extending in the tire diametrical direction and the relatively wide portion comprises an intermediate portion and a bottom portion, with the intermediate portion being wider than the relatively narrow portion and being continuously provided to an inner side in the tire diametrical direction of the relatively narrow portion, and with the bottom portion being wider than the intermediate portion, being continuously provided to an inner side in the tire diametrical direction of the intermediate portion and being in communication with the relatively narrow portion via the intermediate portion.

2. The pneumatic tire according to claim 1, wherein the lateral groove is formed shallower than the sipe, and the relatively wide portion appears on the tread surface at a time when the lateral groove disappears due to the progress of the wear.

3. The pneumatic tire according to claim 1, wherein the sipe extends while intersecting the lateral groove, and the relatively wide portion widens a side apart from the lateral groove larger than a side closer thereto, in the both end portions of the sipe.

4. The pneumatic tire according to claim 1, wherein the relatively wide portion gradually decreases a depth from the tread surface to a widening portion in the one respective side in the width direction, and gradually increases a depth from the tread surface to a widening portion in the other respective side in the width direction, from the one end portion of the sipe toward the other end portion.

* * * * *